United States Patent [19]

Asbra et al.

[11] Patent Number: 4,920,999

[45] Date of Patent: May 1, 1990

[54] AIR ACTUATED VALVE SYSTEM WITH SEISMIC CONTROLLER

[75] Inventors: Martin R. Asbra, 2475 Butternut Dr., Hillsborough, Calif. 94010; Andrew F. Asbra, San Mateo; Nicholas J. Bovis, Burlingame, both of Calif.

[73] Assignees: Andrene Associates; Martin R. Asbra, both of Burlingame, Calif. ; a part interest

[21] Appl. No.: 387,579

[22] Filed: Jul. 31, 1989

Related U.S. Application Data

[63] Continuation-in-part of Ser. No. 254,872, Oct. 7, 1988, Pat. No. 4,852,600.

[51] Int. Cl.⁵ .............................................. F16K 17/36
[52] U.S. Cl. ........................................ 137/38; 137/46; 251/29
[58] Field of Search ...................... 137/38, 39, 46, 557; 251/29

[56] References Cited

U.S. PATENT DOCUMENTS

| 3,043,321 | 7/1962 | Hewitt | 137/46 |
| 3,089,512 | 5/1963 | Julien | 251/29 X |
| 3,948,478 | 4/1976 | Vind | 251/29 |
| 4,094,332 | 6/1978 | Poff . | |
| 4,174,729 | 11/1979 | Roark | 137/557 |
| 4,197,867 | 4/1980 | Roger . | |
| 4,503,717 | 3/1985 | Keller . | |

FOREIGN PATENT DOCUMENTS 154567 9/1982 Japan ..................................... 137/38

Primary Examiner—Robert G. Nilson
Attorney, Agent, or Firm—Donald Diamond

[57] ABSTRACT

An air actuated valve system for shutting off fluid flow in a fluid conduit includes a seismic valve disposed in a seismic air circuit which is coupled to a primary air circuit. The primary air circuit delivers air at a high pressure to an air driven actuator which maintains a shut off valve in a fluid conduit in an open position. The high air pressure flows through an air switch which is operationally open and coupled to the seismic air circuit such that when the seismic valve is closed a pilot air pressure is prevented from flowing to the air switch. In the absence of the pilot air pressure, air pressure is bled from the air switch, causing the air switch to move from an open to a closed position, thus preventing air from flowing to the air actuator.

11 Claims, 7 Drawing Sheets

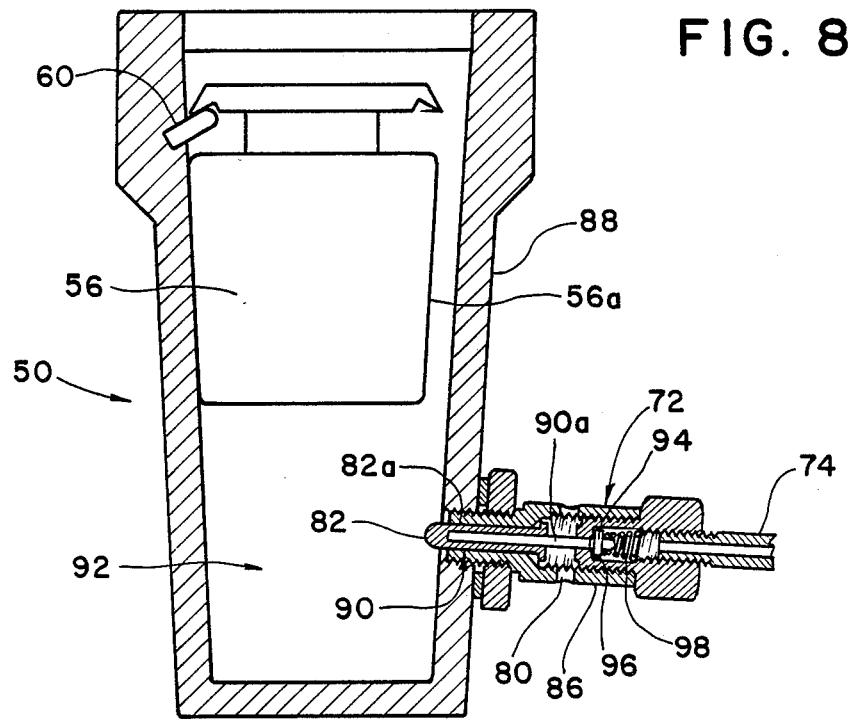
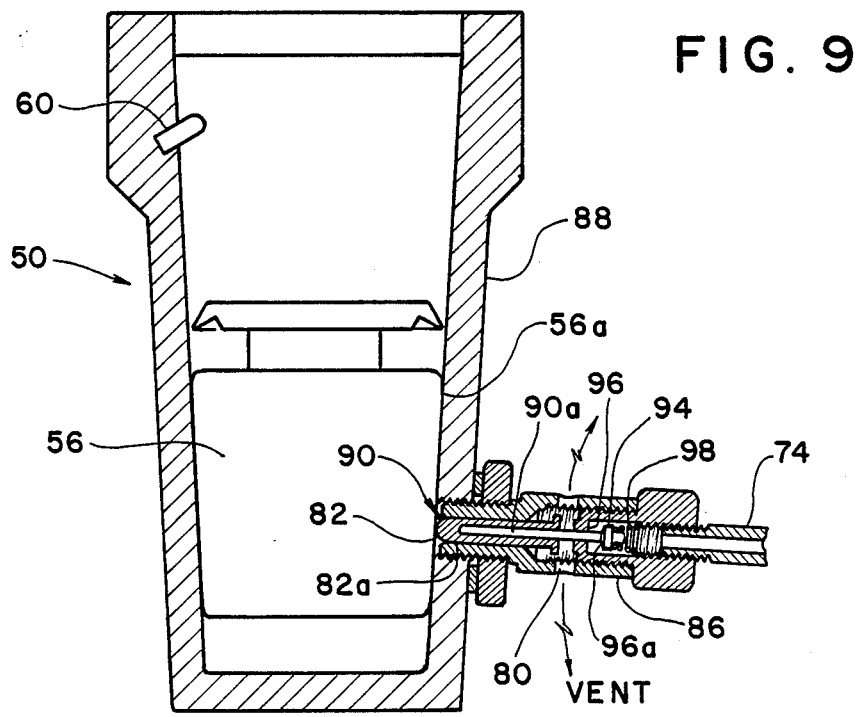

AIR ACTUATED VALVE SYSTEM WITH SEISMIC CONTROLLER

CROSS-REFERENCE TO RELATED APPLICATION

This application is a continuation-in-part of U.S. patent application No. 254,872, filed Oct. 7, 1988 and entitled Air Actuated Valve System With Seismic Controller, now U.S. Pat. No. 4,852,600.

BACKGROUND OF THE INVENTION

1. Field of the Invention

The present invention relates generally to fluid actuated valve systems, and more particularly, to an air actuated valve system having an integrated seismic control circuit.

2. Description of the Related Art

Seismic valves which are used to shut off fluid flow upon experiencing a predetermined level of seismic activity are generally known. Where there is a high probability of seismic disturbances, such as earthquakes, seismic valves are necessary to prevent the release of hazardous and/or flammable substances such as natural gas and LPG.

One such seismic valve is described in U.S. Pat. No. 4,745,934 to Greer et al. The seismic valve is a pin supported gate valve having a gas-tight reset system. The seismic sensing component of the valve actuates shut off means when subjected to a predetermined amount and type of horizontal sinusoidal oscillation.

Although the seismic valve described above is effective for shutting off fluid flow, the valve is normally installed in a gas line between a meter and an associated structure. Due to the placement of the seismic valve directly in the fluid conduit, limitations are imposed upon the size of the conduit and the type of materials handled by the conduit.

SUMMARY OF THE INVENTION

An object of the present invention is to provide an air actuated valve system which is controlled by a seismic valve.

Another object of the present invention is to control a shut off valve disposed in a fluid conduit with a seismically actuated air switch.

In a preferred embodiment, an air actuated valve system for shutting off fluid flow in fluid conduit includes a fluid shut off valve for placement in the fluid conduit, an air driven actuator, connected to the fluid shut off valve, for moving the fluid shut off valve between open and closed positions, a primary air circuit, in fluid communication with the air driven actuator, for supplying air to the air driven actuator at a pressure sufficient to maintain the fluid shut off valve in the open position, an air switch disposed in the primary air circuit upstream of the air driven actuator and being movable between open and closed positions, and seismic control means, connected to the air switch, for shutting off air to the air driven actuator in response to a predetermined level of seismic activity.

Preferably, the seismic control means includes a seismic air circuit, in fluid communication with the primary air circuit and the air switch, for supplying air to the air switch at a pressure sufficient to maintain the air switch in the open position, and a seismic valve disposed in the seismic air circuit for shutting off air supplied to the air switch in response to a predetermined level of seismic activity, thereby causing the air switch to close and thus the shut off valve to close.

These objects, together with other objects and advantages which will be subsequently apparent reside in the details of construction and operation of the air actuated valve system as more fully hereinafter described and claimed, reference being had to the accompanying drawings forming a part hereof, wherein like reference numerals refer to like parts throughout.

BRIEF DESCRIPTION OF THE DRAWINGS

FIGS. 6–13 are sectional views showing various embodiments of a venting value.

DETAILED DESCRIPTION OF THE PREFERRED EMBODIMENTS

Figure 1:
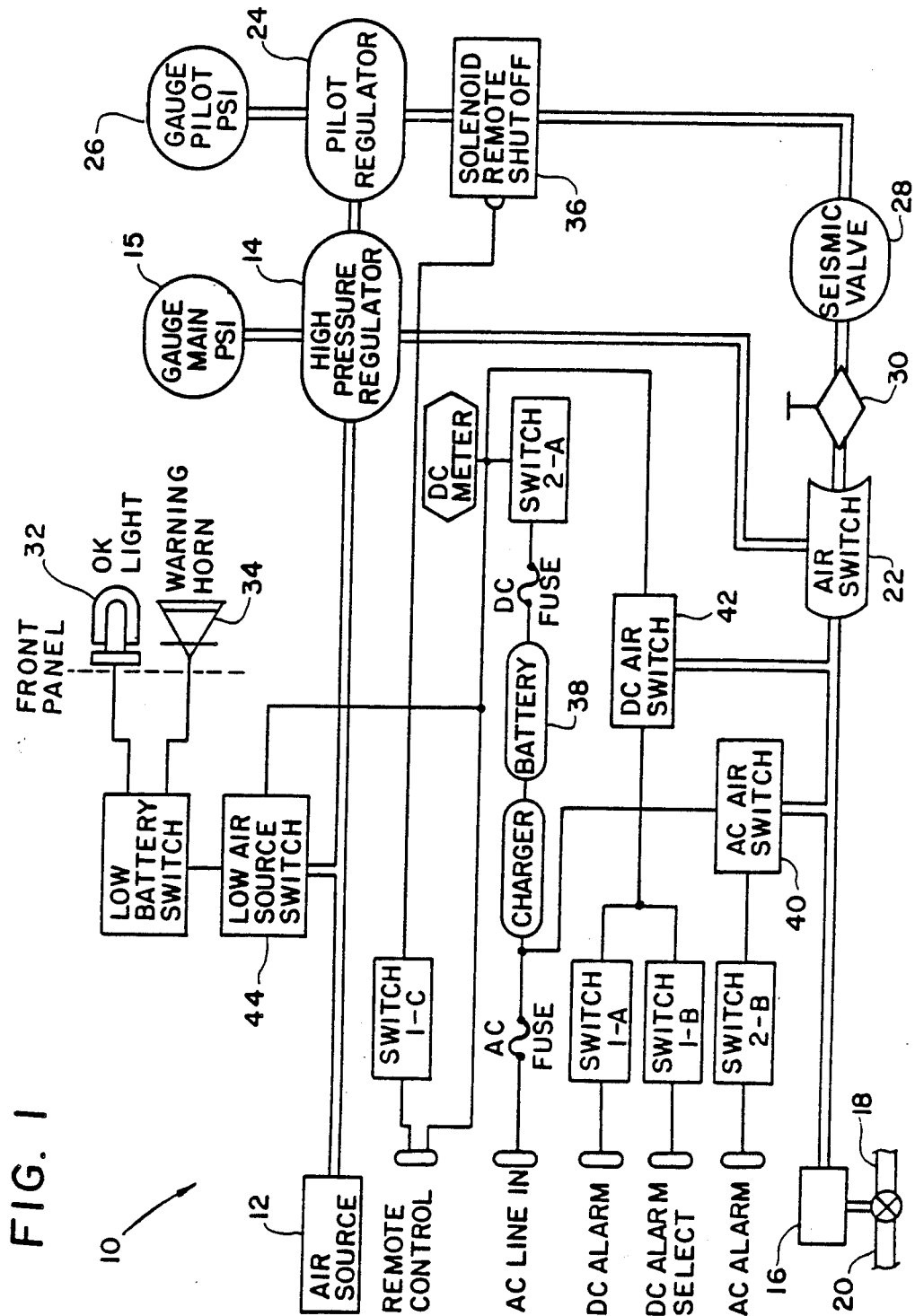
FIG. 1 is a schematic view of an air actuated valve system according to the present invention.

Referring now to FIG. 1, an air actuated valve system according to the present invention is generally referred to by the numeral 10. The system 10 includes an air source 12, such as an air compressor and storage tank. The air compressor is selected to provide a continuous air supply of about 100–200 psi. This pressure is regulated by a high pressure regulator 14 to reduce the pressure from the air source 12 to about 80–100 psi. Compressed air, preferably at about 90 psi is continuously supplied through pneumatic conduit from the air source 12, through the regulator 14 to an air driven actuator 16 coupled to a fluid shut off valve 18 movable in a fluid conduit 20.

The air driven actuator 16 is of a spring-return type in which air pressure coming into the actuator opposes a spring force which normally biases the valve 18 in a closed position. When air enters the actuator 16 at a sufficient level of pressure to overcome the spring force, an element, such as a shaft, within the actuator 16 is driven by the air pressure to rotate or otherwise move the valve 18 from a closed position to an open position. Thus, as long as the actuator 16 is supplied with air at a pressure level sufficient to overcome the spring force, the fluid shut off valve 18 will be maintained in an open position. When the air pressure is removed, the valve 18 closes due to the spring force. Air driven actuators of this type are generally known and commercially available. An example is a series 39 spring-return actuator sold by Worcester Controls, Marlborough, Mass.

The high pressure regulator 14 is equipped with a gauge 15 which is used to monitor the regulated air pressure.

The air source 12, the high pressure regulator 14 and the pneumatic conduit which connects the air source and regulator to the air actuator 16 constitute a primary air circuit which communicates air from the source 12 to the air driven actuator 16 at high pressure. An air switch 22, which acts as a control valve, is disposed in the primary air circuit upstream of the air driven actuator 16 and downstream of the high pressure regulator 14. The air switch 22 is movable between open and closed positions by seismic control means which shuts off air to the air driven actuator 16 in response to a predetermined level of seismic activity. Basically, the seismic control means actuates the air switch 22, shutting off the supply of air in the primary air circuit to the air drive actuator 16.

The seismic control means includes a seismic air circuit, in fluid communication with the primary air circuit, which receives air from the high pressure regulator 14 and delivers a "pilot" air pressure to the air switch 22. A low pressure regulator or pilot regulator 24 reduces the pressure in the seismic air circuit to about 10–15 psi. A gauge 26 is coupled to the pilot regulator to facilitate monitoring of pilot pressure.

A seismic valve 28 allows pilot air pressure to flow through pneumatic conduit to the air switch 22. In the presence of a predetermined level of seismic activity, the seismic valve is actuated to shut off the flow of pilot air to the air switch 22, thereby causing the air switch to switch from an ON position to an OFF position to prevent air in the primary air circuit from flowing to the air actuator 16. A bleed port 30 is disposed between the seismic valve 28 and the air switch 22 such that when the seismic valve closes, the bleed port 30 depletes the pilot pressure applied to the air switch 22, thereby deactivating the air switch which, in turn, shuts off the shut off valve 18.

An electrical component of the system includes a warning indicator which indicates failure of an external air supply of air compressor. The reverse in the air source 12, such as an air tank, will gradually decrease due to the small bleed port 30. An OK light 32 is illuminated on a front panel so long as sufficient air pressure remains in the primary air circuit. The air actuator 16 can continue to hold the shut off valve 18 in an open position until the pressure drops to a predetermined level as, for example, 70±30 psi. Therefore, the front panel includes a warning horn 34 which sounds when pressure drops below a predetermined threshold level. Since it may take one hour for pressure to fall to a predetermined level, this will enable the operators to have sufficient time to correct the malfunctioning air source.

The electrical component of the system provides local and remote alarms both AC and DC powered, and separate indicators notify that the system is operational, or has a fault, such as low air supply or low battery.

A manual solenoid remote shut off 36 is coupled to a remote control circuit so as to provde a manual remote control shut off capability.

The electrical component further includes a tricklecharged storage battery 38, air pressure switches 40, 42 and 44, toggle switches 1-A, 1-B, 2-A, and 2-B which provide alarm control and DC power, and indicator lamps and horns for actuation of warning signals and indicating system status.

Any fault in the electrical circuit, including complete power loss, will not effect the pneumatic operation of the system. An operational alarm connection may be made to the security or night alarm system of the installation site. Also, assuming system activation due to earthquake or nearby explosion, the alarms may be shut off by moving toggle switches to their OFF position according to the following table.

TABLE 1

| SWITCH NUMBER FUNCTION | | 1-A DC ALARM | 1-B SELECT DC ALARM | 1-C REMOTE CONTROL | 2-A DC POWER | 2-B AC ALARM |
| --- | --- | --- | --- | --- | --- | --- |
| TOGGLE SWITCH POSITIONS | TOP | ON | ON | ON | ON | ON |
| | CENTER | OFF | OFF | OFF | OFF | OFF |
| | BOTTOM | ON | OFF | ON | ON | ON |

When resetting the system after a seismic event, it is preferable to first perform a damage and leak check of the protective area. Then, the seismic valve is reset by pulling upward on a reset ring and then down to reset the gate/actuator on its pin at the top of the chamber. This structure is fully described in U.S. Pat. No. 4,745,939, which is incorporated herein by reference.

Figure 2:
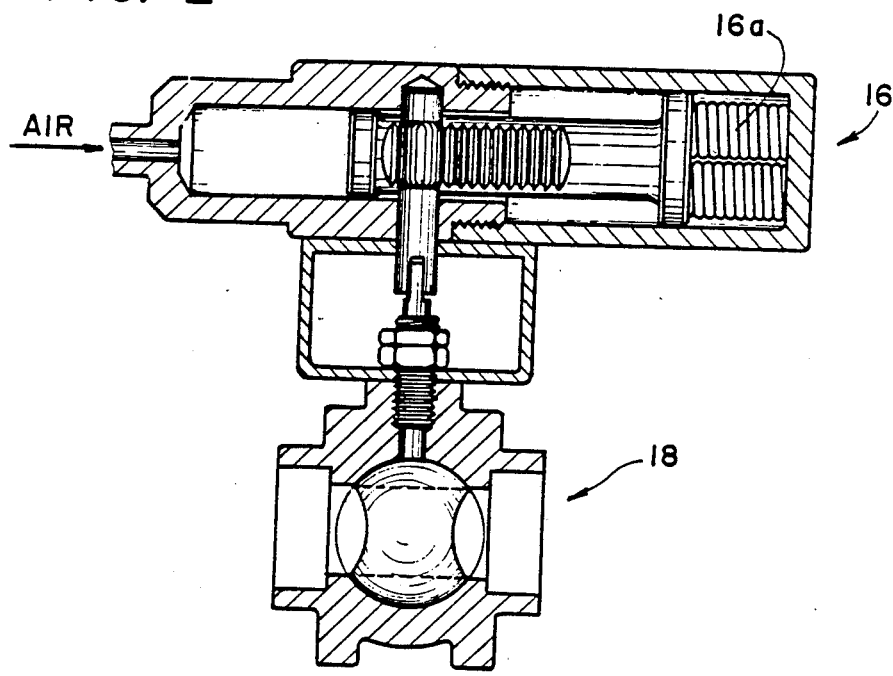
FIG. 2 is a schematic, cross-sectional view, illustrating an air driven actuator used in the system of claim 1.

An example of an air driven actuator 16 and shut off valve 18 is illustrated in FIG. 2. Air under high pressure enters the actuator 16 from one end thereof and, through a gear mechanism, causes a ball element of a ball valve to rotate to the open position illustrated in FIG. 2. The gear mechanism is a piston-actuated rack and pinion gear system which produces a torque for rotating the valve. A spring 16a opposes piston movement imparted by air pressure such that when air pressure is removed, the spring causes the piston to return to its original position in which the ball valve is in a closed state. Any other type of air actuator and valve combination can be used so long as a spring-return mechanism causes the valve to close when air is removed. Such an alternative embodiment may include a pneumatic actuator which has a piston-type assembly wherein a cam-shaped lever is driven by a piston-operated slide to produce a torque for rotating a valve through its opening and closing cycles. This type of actuator is available from Worcester Controls. Moreover, the pneumatic actuator 16 may be used in combination with diverse types of valves such as ball valves, butterfly valves, gate valves, etc.

Figure 3A:
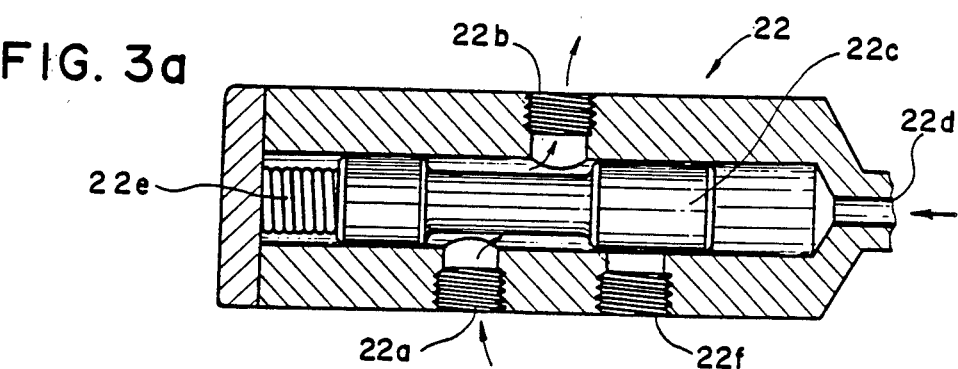
FIGS. 3a and 3b are schematic, cross-sectional views illustrating an air switch used in the system of FIG. 1 in the open and closed positions, respectively.
Figure 3B:
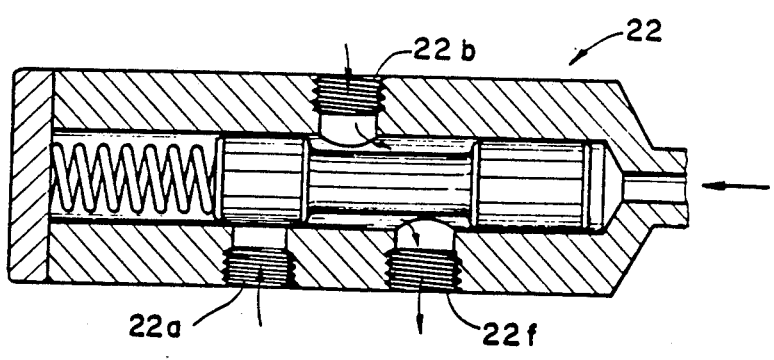

FIGS. 3a and 3b illustrate an exemplary air switch 22, which is in an open position in FIG. 3a and closed in FIG. 3b. Referring to FIG. 3a, air from the primary air circuit, at a relatively high pressure, enters an inlet 22a of the air switch 22 and passes through an outlet 22b to the air driven actuator 16. In order for this to occur, a piston 22c is driven from right to left by pilot air pressure from the seismic air circuit which enters the air switch 22 from a right hand side at 22d. A spring 22e opposes movement of the piston 22c such that when the pilot air pressure is removed, such as when the seismic valve is actuated, the spring 22e returns the piston to its normally closed position illustrated in FIG. 3b. The piston 22c has two enlarged portions, one of which seats over the inlet 22a when the piston is in its original position shown in FIG. 3b. An exhaust port 22f, which is closed in FIG. 3a, becomes open when the spring returns the piston. Thus, incoming air under high pressure is blocked at the inlet 22a, and air downstream of the air switch 22 bleeds back through the air switch out the exhaust port 22f. This type of air switch is available from Numatics of Highland, Mich.

In the system described above, a vent 30 is provided between the seismic valve 28 and the air switch 22. Although this type of arrangement is functionally adequate, it can provide a leakage of air pressure such that the air source 12 must be periodically operated to maintain sufficient pressure in the lines.

An alternative vent structure is illustrated in FIGS. 4–11, in which the vent is provided in a closed loop so that, until the seismic valve is actuated, the vent is closed.

Figure 4:
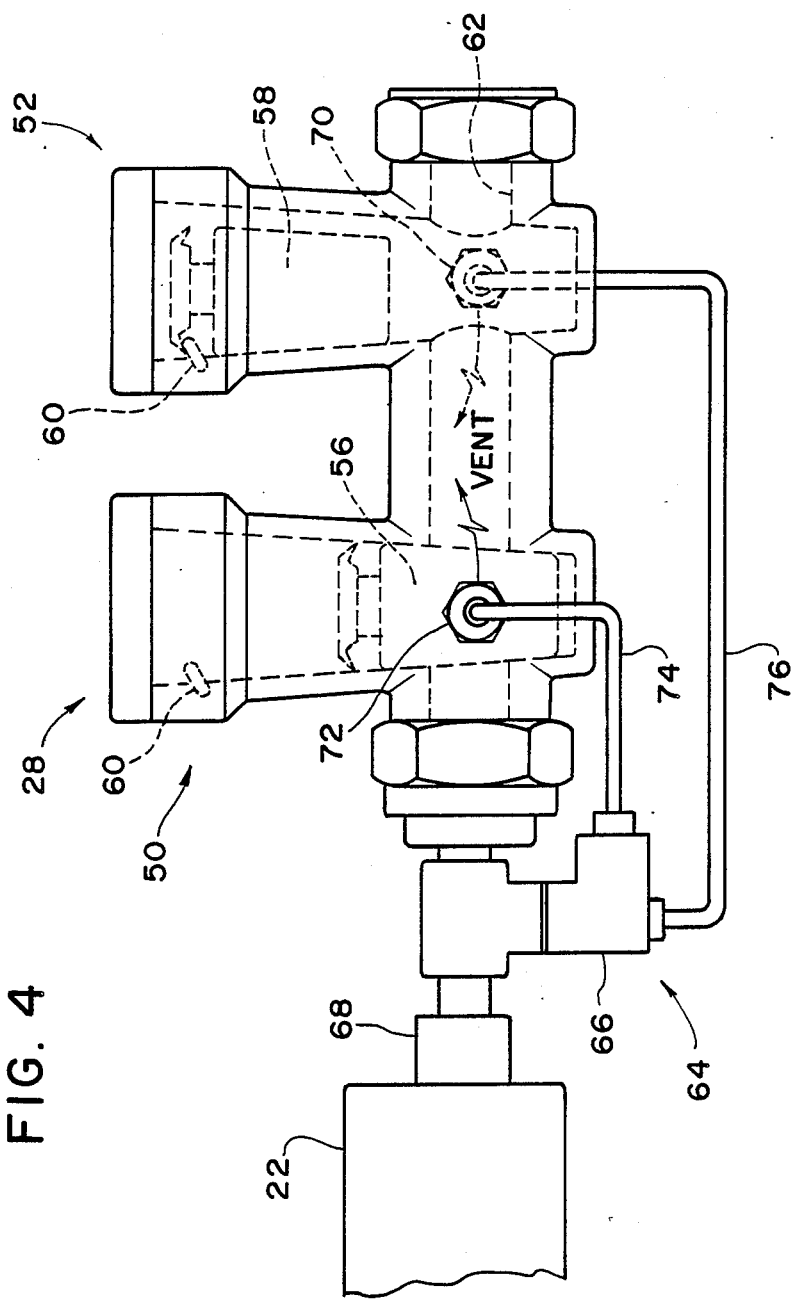
FIG. 4 is a schematic view of a seismic valve including a venting assembly according to another aspect of the present invention.

Referring to FIG. 4, the seismic valve 28 is a shock actuated shut-off valve for fluid, and has two valve assemblies 50 and 52. Each valve assembly has a valve element 56 and 58, each of which is supported in the upper part of a chamber on a support 60. In the presence of sufficient seismic activity, the valve element is dislodged from its support and falls into the lower part of its corresponding chamber to block the flow of air through a common line 62.

The seismic valve is described in greater detail in U.S. Pat. No. 4,745,939, which is incorporated herein by reference.

A venting valve assembly 64 is disposed between the air switch and the seismic valve for venting air automatically when the seismic valve is actuated. The venting valve assembly includes a coupling 66 in fluid communication with the pneumatic conduit 68 which connects the air switch 22 to the seismic valve 28, venting valves 70 and 72 associated with the seismic valve, and vent lines 74 and 76 connecting the venting valves to the coupling 66. The venting valves 70 and 72 are actuated by the valve elements 56 and 58 of the seismic valve 28. This actuation is described in detail with references to FIGS. 5–11.

Figure 5:
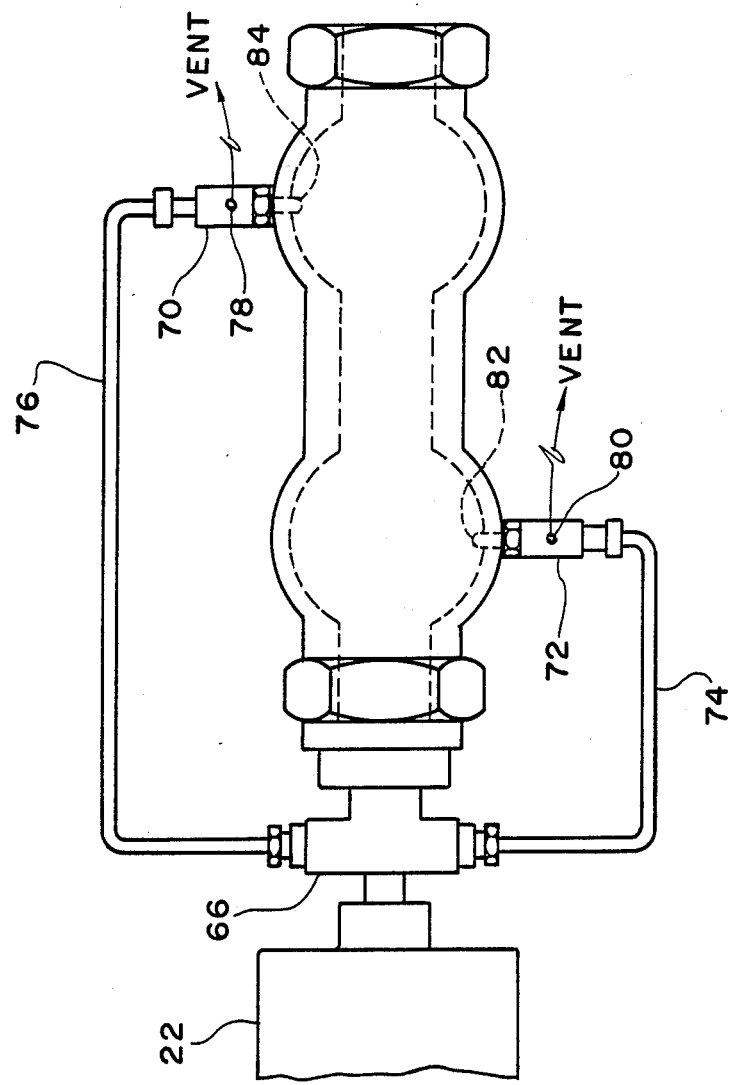
FIG. 5 is a top view of a seismic value showing additional details of the venting system.

In FIG. 5, a slight variation of the coupling 66 is illustrated, in which a T-joint is provided so that air in the line between the air switch 22 and seismic valve 28 is fed through lines 74 and 76 to the respective venting valves 70 and 72. Each venting valve has a vent port 78 and 80 which release air from the line between the seismic valve 28 and air switch 22 upon actuation of the seismic valve. Each venting valve has a protruding element 82 and 84 which extends into the inner chamber of each valve assembly in a lower portion of the chamber so that when the valve element falls due to seismic activity, the outer wall of the valve element pushes the protruding elements 82 and 84 inwardly to cause the air in lines 74 and 76 to vent to the atmosphere.

Figure 6:
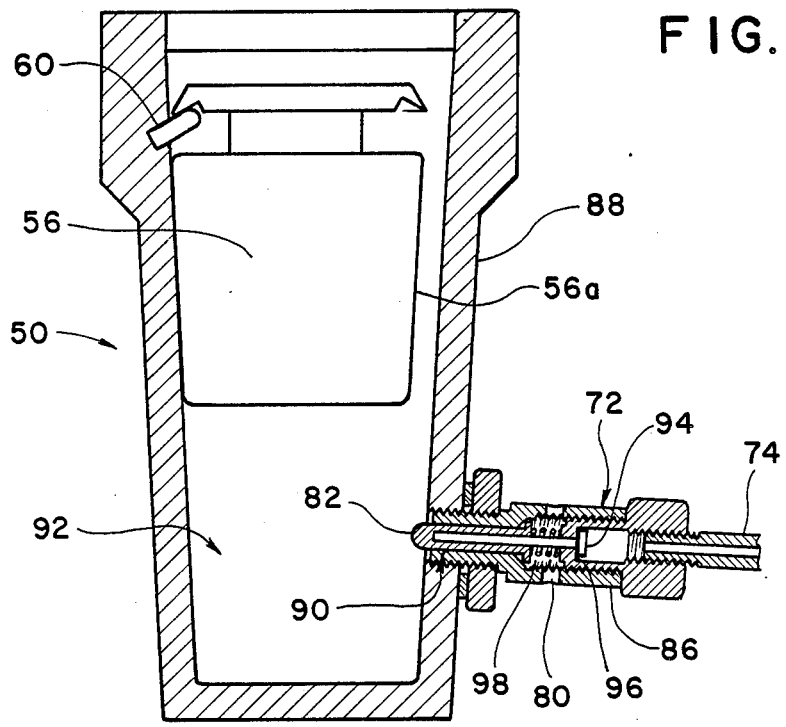

FIG. 6 is a detailed view of one valve assembly 50 in the non-actuated position, with the valve element 56 in its normal, unactuated state in which it is hung on the support 60. The venting valve 72 includes a body 86 having one end threadedly engaged a threaded bore of the seismic valve body 88 and an opposite end to which the venting line 74 is connected. A central passageway extends between the two opposite ends. A valve stem 90 is movably mounted in the central passage way of the valve body 86 and has one end which extends into the chamber 92 of the valve assembly 50. This protruding end has been previously referred to as protruding member 82. The opposite end of the valve stem is provided with a valve 94 which is normally seated on a valve seat 96 so that air in the line 74 is blocked and thus not vented. A spring 98 biases the valve stem and valve 94 into the seated position on the valve seat 96.

Figure 7:
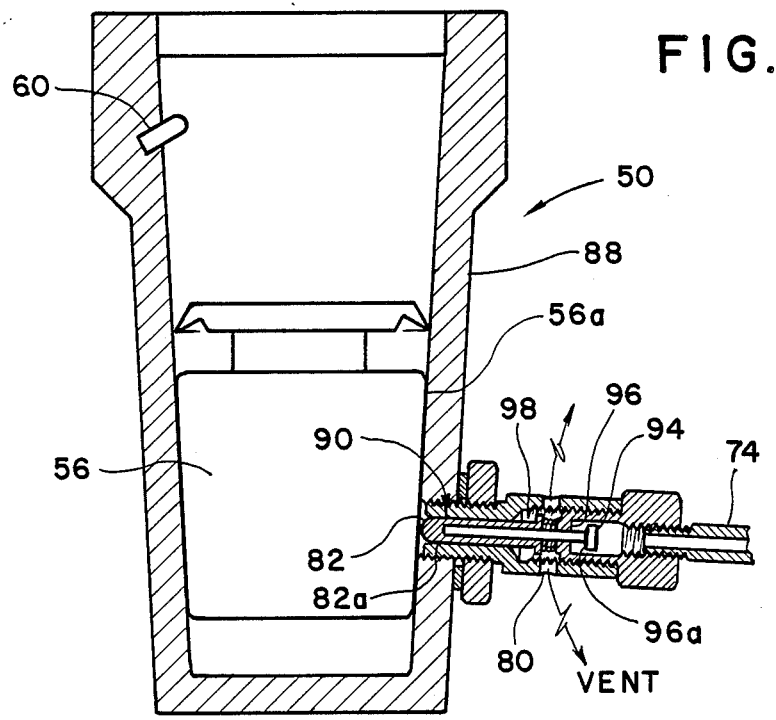

Now referring to FIG. 7, after sufficient seismic activity has dislodged the valve element 56 of the valve assembly 50, the outer sidewall 56a of the valve element 56 pushes the protruding end 82 of the venting valve 72 to the right in FIG. 7, thus lifting the valve 94 off its valve seat 96, and thereby allowing air in line 74 to vent through the vent port 80.

A slightly different embodiment of the venting valve is illustrated in FIGS. 8 and 9, in which the venting valve 72 includes all the same features as stated, except that the spring 98 is disposed on the opposite side of the valve 94, and the valve 94 includes an elastomeric seal 96a which helps prevent inadvertent venting of air. Also, the vent port 80 passes through opposite sides of the body 86 to provide two vent ports. In addition, the valve stem 90 includes a separate abutment portion 82a which has an axial bore in which a stem portion 90a is loosely fitted. A valve member 94 is made as a separate element which is held on one end of the stem portion 90a by an interference fit, or other suitable means.

FIG. 9 is identical to FIG. 8 except that the valve is in the actuated state, in which the protruding portion 82a is pushed inwardly into the venting valve body 86, thereby lifting the valve 94 off the valve seat 96. With the valve 94 unseated, air within lines 74 vents to the atmosphere through the vent ports 80.

Figure 10:
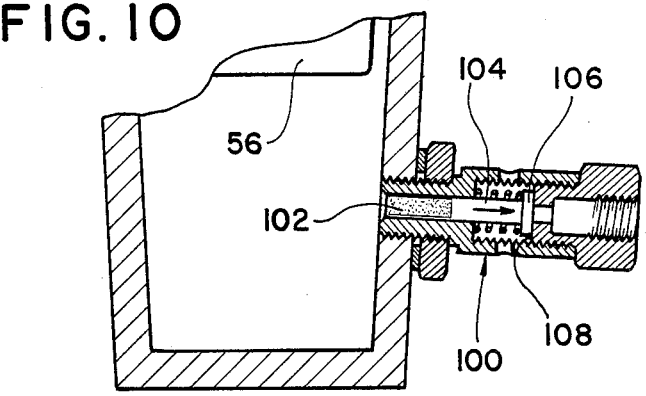
Figure 11:
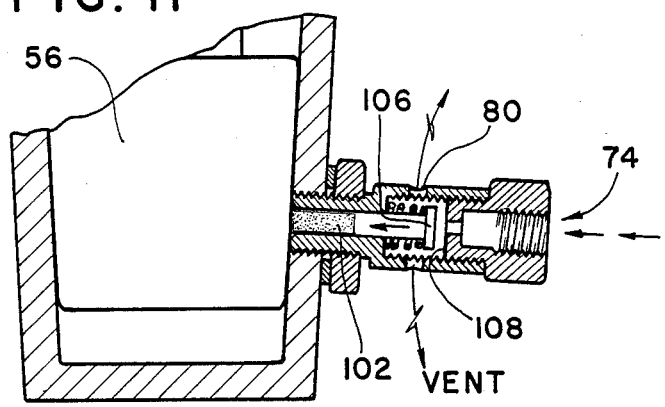

FIGS. 10 and 11 refer to an alternative embodiment of a venting valve in which magnetic attraction is used to actuate the valve. In FIG. 10, the venting valve 100 is illustrated in the closed position, in which a magnetic member 102, which is connected to a valve stem 104 is magnetically biased into a position where a valve 106 is seated over a valve seat 108. The magnetic member is of a type which is used in proximity limit switches, such as the type known as the "70 series" GO brand proximity limit switch which utilizes both reaction forces of magnetic power attraction and repulsion in its operating principles. In the closed position, the position is the result of the attracting force of unlike coils of a primary magnet and a center magnet. This attraction is enhanced by the repelling force of the like poles of the center magnet and a bias magnet. To actuate the valve, a ferrous actuator is moved into position next to the primary magnet (on the left side of the magnetic member in FIG. 10). The magnetic attraction of the primary magnet to the center magnet is weakened, resulting in the movement of the primary magnet towards the ferrous actuator. In the present case, the valve element 56 is the ferrous actuator, so that when the valve element falls into its closed position, the magnetic member 102 moves to the left as shown in FIG. 11. When this occurs, the valve 106 is unseated from the valve seat 108 and air in the line 74 is allowed to vent through the port 80. The primary magnet of the magnet member is labelled with the north pole "N" closest to the ferrous metal valve element 56.

Figure 12:
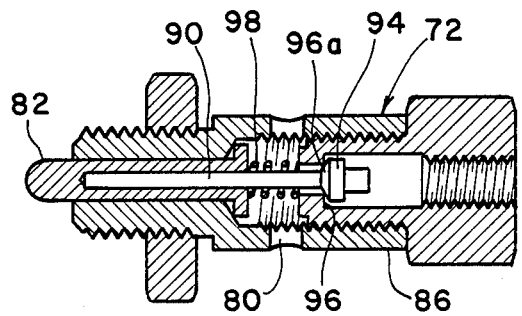
Figure 13:
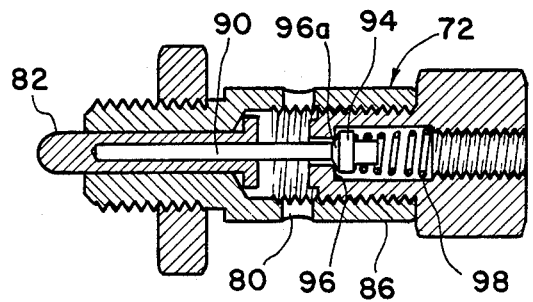

FIGS. 12 and 13 are enlarged views of the venting valve 72 illustrated in FIGS. 6 and 8 respectively.

Although the invention has been described with respect to particular illustrative embodiments, it will be understood that variations and modifications may be made within the true spirit and scope of the present invention.

What we claim is:

1. An air actuated valve system for shutting off fluid flow in a fluid conduit, comprising:
   a fluid shut off valve for replacement in the fluid conduit;

an air drive actuator, connected to the fluid shut off valve, for moving the fluid shut off valve between open and closed positions;

a primary air circuit, in fluid communication with the air driven actuator, for supplying air to the air driven actuator at a pressure sufficient to maintain the fluid shut off valve in the open position;

an air switch disposed in the primary air circuit upstream of the air driven actuator and being movable between open and closed positions;

seismic control means, connected to the air switch, for shutting off air to the air driven actuator in response to a predetermined level of seismic activity, said seismic control means including (a) a seismic air circuit, in fluid communication with the primary air circuit and the air switch, for supplying air to the air switch at a pressure sufficient to maintain the air switch in the open position, and (b) a seismic valve disposed in the seismic air circuit for shutting off air supplied to the air switch in response to a predetermined level of seismic activity, thereby causing the air switch to close and thus the shut off valve to close; and a venting valve assembly disposed between the air switch and the seismic control means for automatically venting air pressure from the air switch in response to a predetermined level of seismic activity actuating the seismic control means.

2. An air actuated valve system according to claim 1, wherein the air driven actuator has a spring-return mechanism which moves the shut off valve to the closed position in the absence of air pressure.

3. An air actuated valve system according to claim 1, wherein the air switch includes a movable element movable between open and closed positions, and a spring-return mechanism for moving the movable element to the closed position in the absence of pilot air pressure.

4. An air actuated valve system according to claim 1, wherein the primary air circuit includes an air source, a high pressure regulator, and pneumatic conduit for connecting the air source to the air actuator through the high pressure regulator and through the air switch.

5. An air actuated valve system according to claim 5, wherein the primary air circuit further includes a low air pressure warning system for indicating a condition of low air pressure in the primary air conduit.

6. An air actuated valve system according to claim 1, wherein the seismic air circuit includes a pilot air regulator, in fluid communication with the high pressure regulator, for reducing air pressure from a level regulated by the high pressure regulator to a lower pilot air pressure, and pneumatic conduit for connecting the pilot air regulator to the high pressure regulator and to the seismic valve, and for connecting the seismic valve to the air switch through the venting valve assembly.

7. An air actuated valve system according to claim 1, further comprising an electrical component for monitoring air pressure in the valve system and for indicating a warning signal when pressure falls to a predetermined level.

8. An air actuated valve system according to claim 8, wherein the electrical component further includes a test circuit for checking the operational status of the air actuated valve system.

9. An air actuated valve system according to claim 1, wherein the venting valve assembly includes a coupling in fluid communication with the pneumatic conduit which connects the air switch to the seismic valve, at least one venting valve associated with the seismic valve, and vent lines connecting the venting valve to the coupling, thereby communicating pilot air pressure to the venting valves.

10. An air actuated valve system according to claim 9, wherein the seismic valve has two valve assemblies, each including a valve body defining a substantially vertically oriented chamber and a valve element supported in an upper portion of the chamber and having an outer sidewall and being operative to fall into a lower portion of the chamber to block airflow when exposed to sufficient seismic activity, and wherein the at least one venting valve includes first and second venting valves, each including a body having one end threadedly received in a bore provided in a corresponding valve body of the seismic valve, an opposite end coupled to a corresponding vent line, a longitudinal passageway, a valve seat in the passageway, a valve stem movably mounted in the venting valve body and having a valve set at one end for seating over the valve seat and an opposite end which protrudes into the chamber of a corresponding valve assembly of the seismic valve, the valve being movable from a seated position on the valve seat by the valve element of the valve assembly by the seismic valve contacting the protruding end of the valve stem.

11. An air actuated valve system according to claim 11, wherein the seismic valve has two valve assemblies, each including a valve body defining a substantially vertically oriented chamber and a valve element supported in an upper portion of the chamber and having a outer sidewall and being operative to fall into a lower portion of the chamber to block airflow when exposed to sufficient seismic activity, and wherein the at least one venting valve includes first and second venting valves, each including a body having one end threadedly received in a bore provided in a corresponding valve body of the seismic valve, an opposite end coupled to a corresponding vent line, a longitudinal passageway, a valve seat in the passageway, a valve stem movably mounted in the venting valve body and having a valve at one end for seating over the seat and an opposite end which is coupled to a magnetic member, the valve being movable from a seated position on the valve seat by magnetic attraction of the magnetic member to the valve element of the valve assembly of the seismic valve.

* * * * *